United States Patent [19]
Nelson et al.

[11] Patent Number: 5,579,863
[45] Date of Patent: Dec. 3, 1996

[54] STEERING SYSTEM FOR AN ARTICULATED MACHINE

[75] Inventors: David E. Nelson, Peoria; Dean A. Wiechman, Plano, both of Ill.

[73] Assignee: Caterpillar Inc., Peoria, Ill.

[21] Appl. No.: 419,303

[22] Filed: Apr. 10, 1995

[51] Int. Cl.$^6$ ........................................ B62D 12/00
[52] U.S. Cl. ................... 180/418; 180/403; 180/315; 74/496
[58] Field of Search .................. 74/492, 496, 504; 180/400, 403, 417, 418, 419, 420, 235, 78, 315, 326, 327

[56] References Cited

U.S. PATENT DOCUMENTS

| 3,672,460 | 6/1972 | Takata | 180/235 X |
| 5,464,251 | 11/1995 | Castellon | 74/492 X |

FOREIGN PATENT DOCUMENTS

| 219-003-A | 2/1985 | Germany | 180/134 |
| 1530-520-A | 12/1989 | U.S.S.R. | 180/134 |

Primary Examiner—Brian L. Johnson
Assistant Examiner—Victor E. Johnson
Attorney, Agent, or Firm—William C. Perry

[57] ABSTRACT

In many instances it has been a recent trend to incorporate the use of electronic controls into various machine functions to reduce the fatigue of an operator. When incorporated into the steering functions of a machine, the electronic controls often do not provide an operator with an "automotive" feel and thus do not work as well in some machine applications as they do in others. The present invention incorporates a mechanical feedback through the steering controls to provide the operator with a feel similar to that of an automotive environment. In addition, the steering controls operate in a manner which provides a variable ratio of steering wheel rotation to steering control valve actuation depending upon the articulation angle of the machine. In so doing, the function of the steering controls will vary with and enhance the operation of each specific mode of machine operation.

24 Claims, 10 Drawing Sheets

Fig_1_

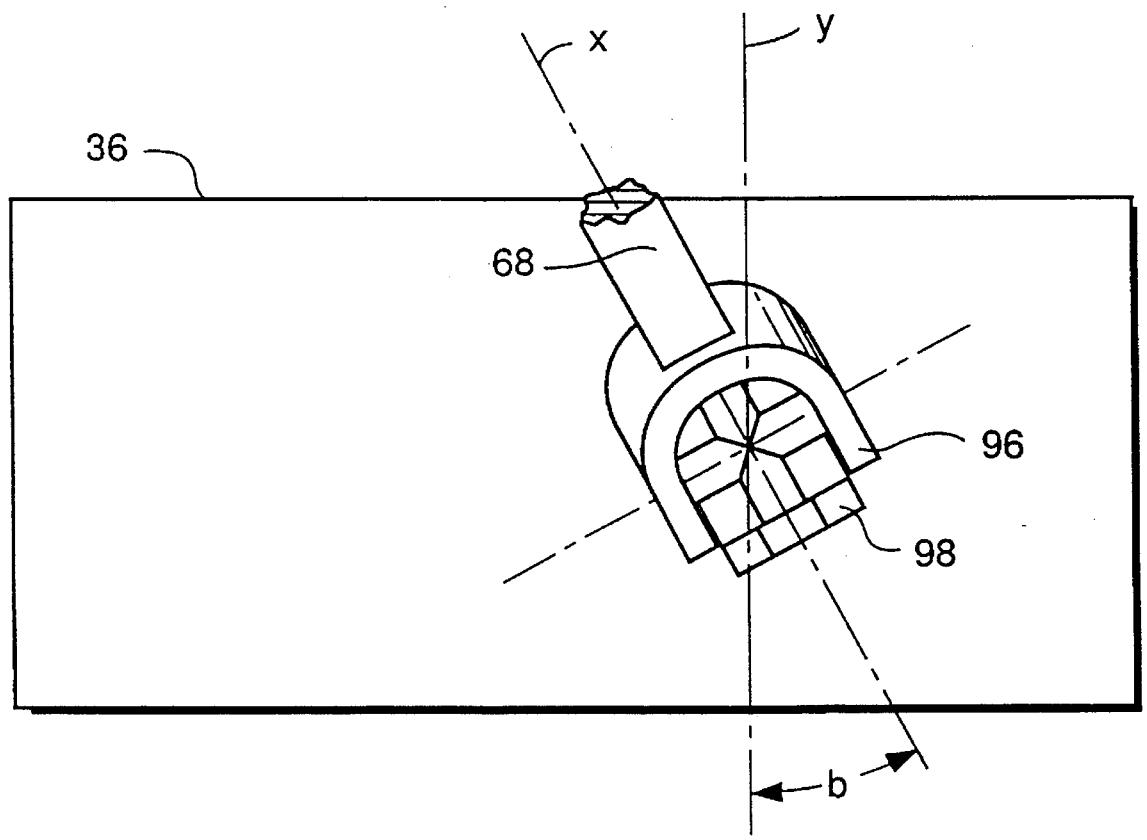
Fig_4_

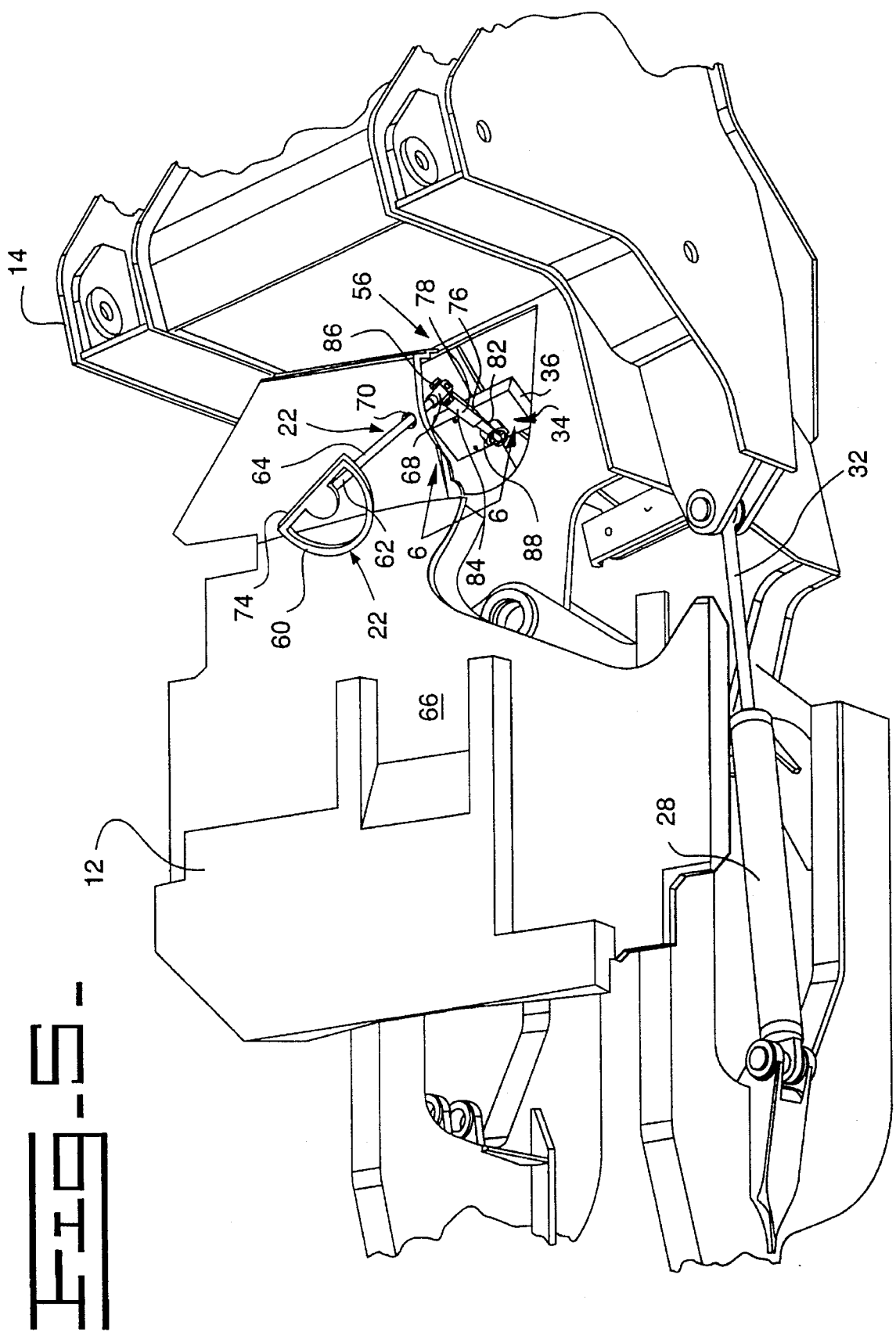

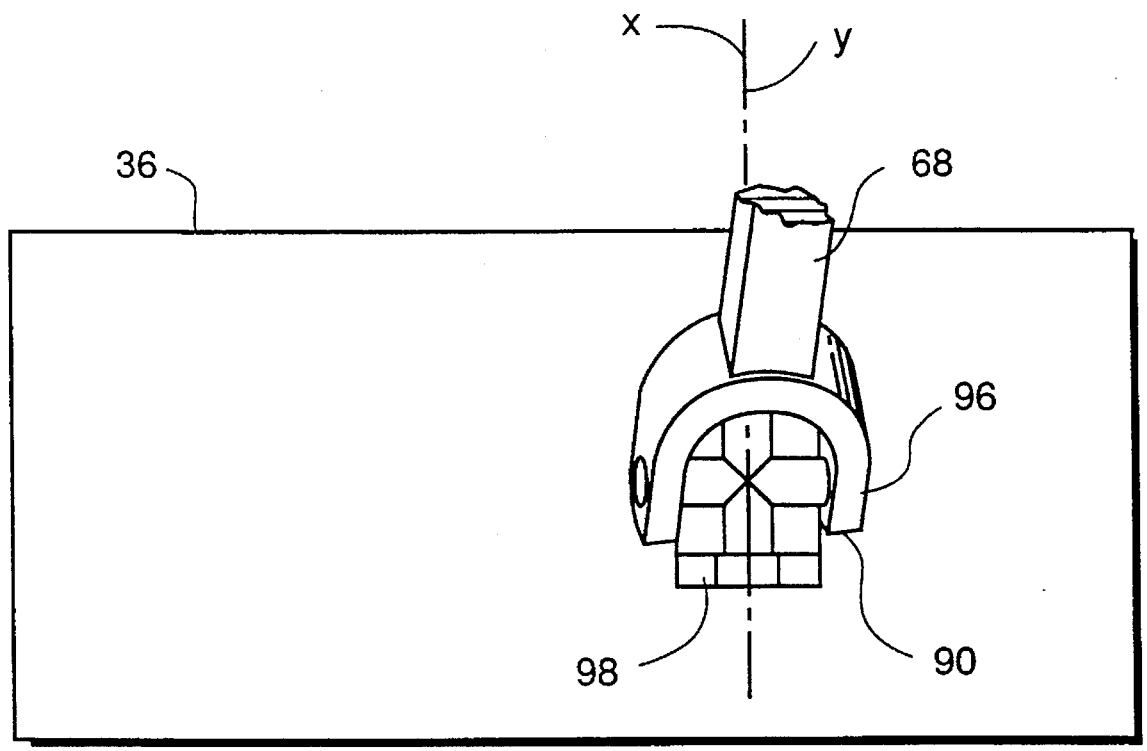
Fig_6_

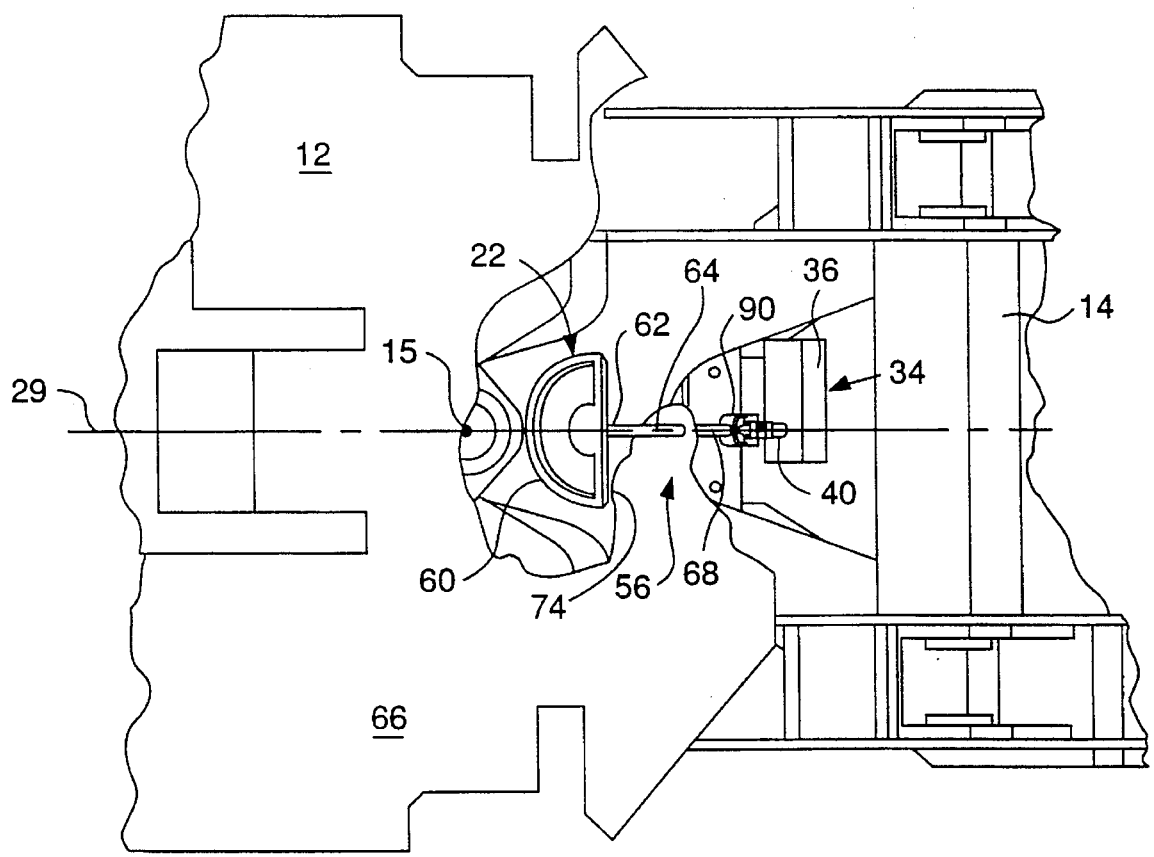

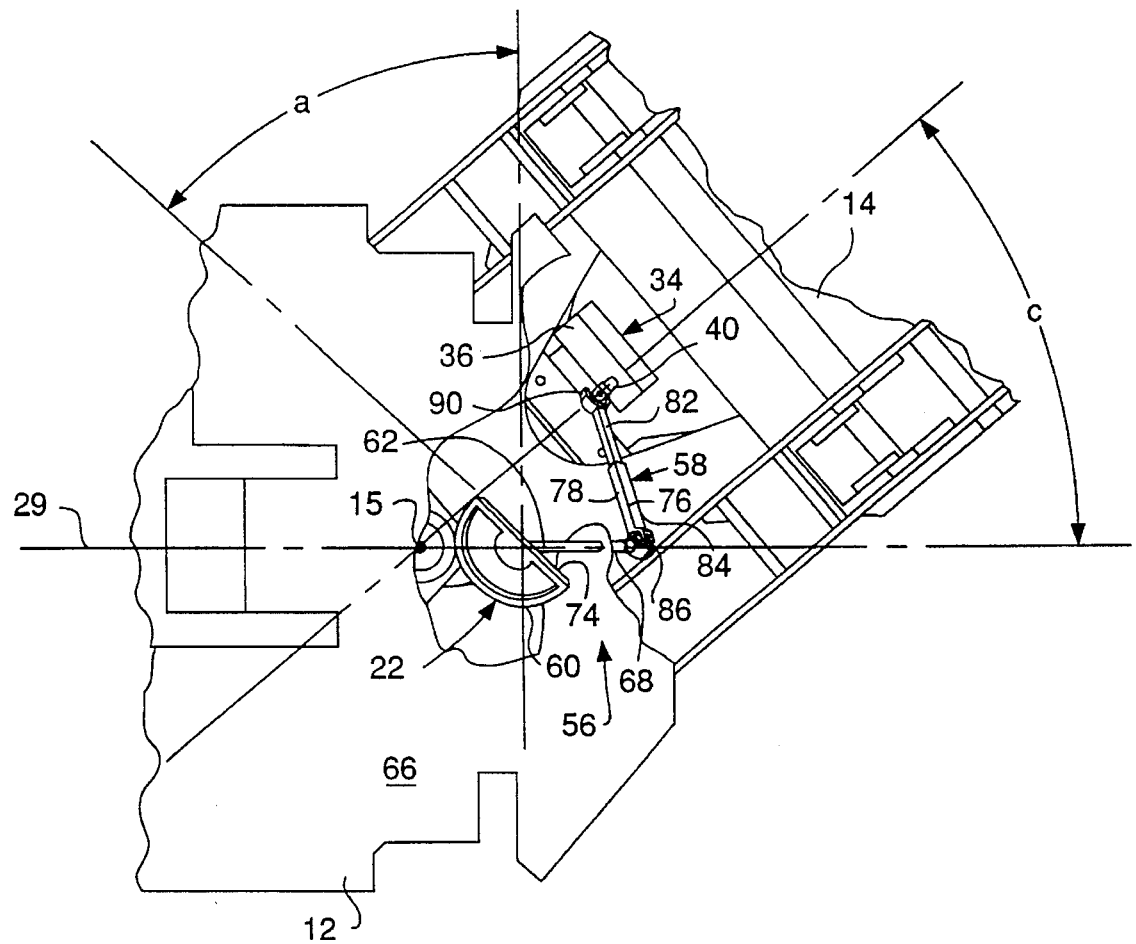

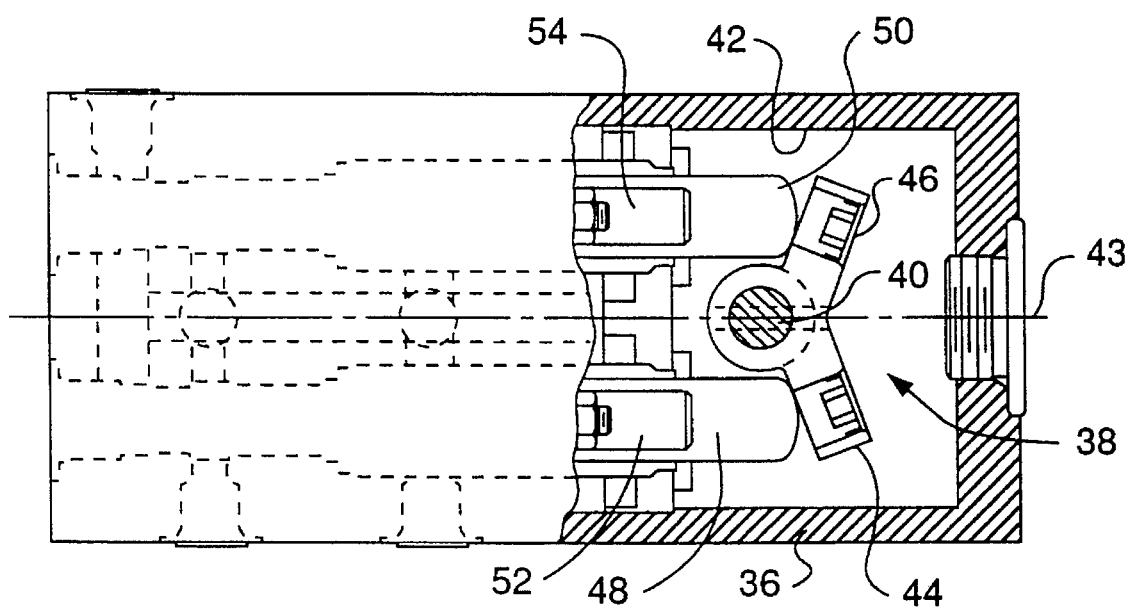

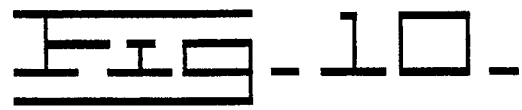
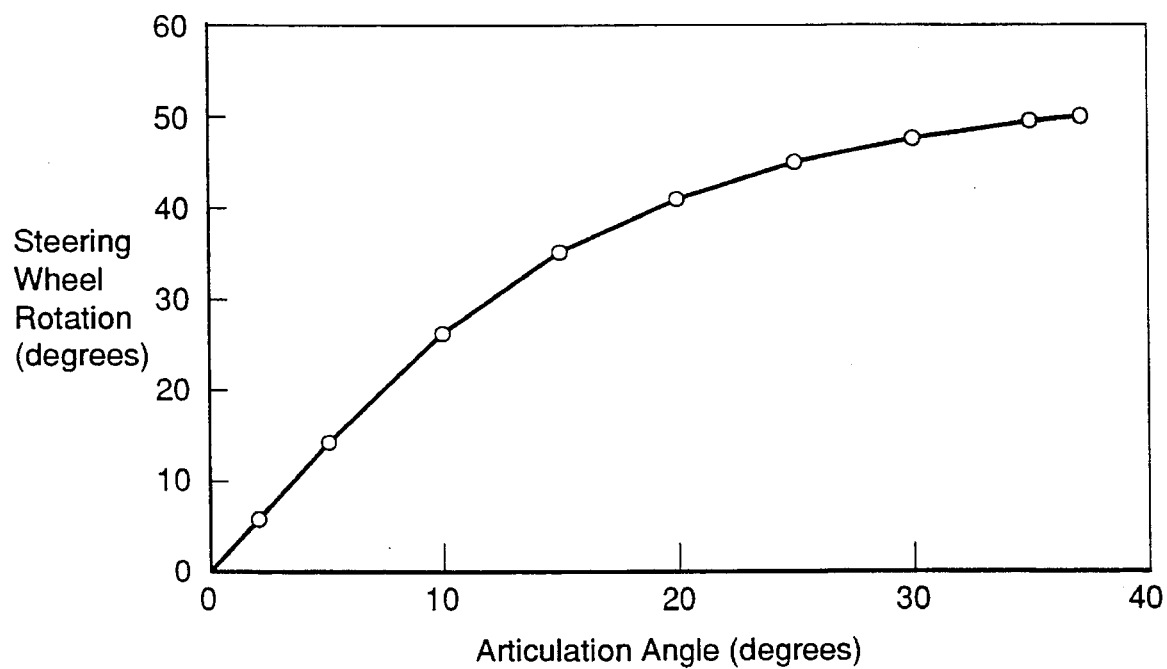

STEERING SYSTEM FOR AN ARTICULATED MACHINE

TECHNICAL FIELD

This invention relates generally to a steering system for an articulated machine and more particularly to a steering system that provides a mechanical feedback to the steering wheel.

BACKGROUND ART

One commonly used method of steering an articulated machine utilizes a pair of hydraulic cylinders that are connected between the front and rear frames of the machine on opposing sides of the articulation point. The cylinders can be selectively actuated to extend one cylinder while retracting the other to pivot the front frame of the machine with respect to the rear frame and thereby provide steering. Pressurized fluid is normally directed to the cylinders by a pump known as a hand metering unit (HMU) that is positioned at the base of the steering column. With the revolution of the steering wheel in either direction, fluid is pumped from the HMU to the steering cylinders to obtain the desired steering function. The more revolutions imparted to the steering wheel, the greater the steering correction. This system has been known to work quite well in several machine applications for many years.

It has been a recent trend in the construction industry to focus on the needs and the comfort of the operator of construction machines. This focus not only addresses the ergonomics of the operator's surroundings but also those functions of the operator that will cause fatigue. In some machines, such as wheel loaders, the method of steering the machine is one known source of operator fatigue. In one mode of normal operation, such as truck loading, the operator must move the machine between a pile of material and a truck into which the material is deposited for subsequent removal from the area. This maneuvering is usually done in a very compact area to reduce the time it takes the machine to cycle between the material and the truck. During this operation, the operator is constantly rotating the steering wheel to achieve maximum machine articulation. One solution to this problem has been to employ various electronic methods to control the flow of pressurized fluid to the steering cylinders. This eliminates the need for the operator to rotate the steering wheel to achieve a pumping action. In some instances, a steering actuator is provided that may or may not be a steering wheel that incorporates the electronic controls. In this type of steering actuator, small degrees of movement will typically result in maximum degrees of machine articulation. This greatly reduces the amount of motion required by the operator and thereby the reduces the resulting fatigue. While this method is highly successful, it does not necessarily lend itself as well to other modes of operation where the machine must travel over a roadway for substantial distances to move the material. This operation is generally known as "load and carry". In this mode it is desirable to provide the operator with a more "automotive" feel to the steering actuator to allow larger amounts of movement to provide smaller amounts of correction for the machine as it moves at higher speeds. Since the electronically controlled steering system is set up to provide quick response to reduce cycle time, the ride under roading conditions may experience rather jerky corrections making the ride rather uncomfortable and contributing to operator fatigue of a different variety.

Another disadvantage that exists with a steering system that utilizes a HMU is the requirement for the transmission controls to be separated from the steering controls. Since the steering wheel requires several rotations to achieve larger turning angles, the transmission control must be located in a location in close proximity to the steering wheel so they may be manipulated by one hand while the operator steers with the other. This only adds to the "busyness" of the operator which again adds to his or her fatigue.

The present invention is directed to overcoming one or more of the problems as set forth above.

DISCLOSURE OF THE INVENTION

In one aspect of the invention a steering system is provided for use with an articulated machine that has first and second frame members that are mounted to one another for pivoting movement relative to one another in response to a fluid actuator connected therebetween. A means of controlling pressurized fluid to the fluid actuator is provided and is mounted on one of the first frame or second frame members. A means for actuating the control means is provided that is mounted on the other of the first and second frame members. A connecting means extends between the actuating means and the controlling means and is attached to the actuating means by a first U-joint and to the controlling means by the second U-joint.

In another aspect of the invention a steering system is adapted for use with an articulated machine that has first and second frame members pivotally connected to one another for relative movement therebetween. At least one hydraulic cylinder is connected between the first and second frame members and is actuatable to move the respective frame members with respect to one another to provide steering for the machine. A steering actuator is rotatably mounted on the first frame member and a control valve is mounted on the second frame. The control valve has a rotary actuator that is rotatable with respect to the control valve to selectively control the movement of the hydraulic cylinder. A connecting means has a first end portion connected to the steering actuator and a second end portion connected to the rotary actuator of the control valve. The connecting means is operable in a first mode to translate the rotary movement of the steering actuator into a rotary input of the rotary actuator and a second mode wherein movement of the control valve as it moves with the second frame member relative to the first frame member, is translated into a rotation of the rotary actuator in a direction counter to that of the rotary input imparted by the steering actuator.

Yet another embodiment of the present invention includes a steering system for an articulated machine that includes a first frame member and a second frame member that is pivotally mounted to the first frame member for relative movement with respect thereto. At least one fluid actuator is connected between the first and second frame members and is moveable to cause the relative movement between the frame members to provide steering for the machine. A steering actuator is rotatably mounted on the first frame member and a control valve is mounted on the second frame member. The control valve defines an actuator that is rotatable with respect to the control valve to control the movement of the fluid actuator. A connecting means has a first end portion connected to the steering actuator by a first U-joint and a second end portion is connected to the rotary actuator by a second U-joint. The connecting means is operational in a first mode wherein the amount of rotation of the steering actuator is substantially the same as that translated to the rotary actuator when the first and second frame members are substantially aligned along a longitudinal centerline of the machine and a second mode wherein the amount of rotation translated to the rotary actuator is greater than that of the steering actuator when the frame members are angled with respect to one another.

With a steering system for an articulated machine as set forth above, the operator of the machine is provided with a mechanical feedback through the steering wheel. Not only does the steering system provide the operator with an automotive type "feel", it also provides a "variable gain" feature that allows the steering system to operate in two different modes. When the two frames of the vehicle are generally aligned along the longitudinal centerline of the vehicle, the steering wheel may be rotated a significant amount to obtain small steering corrections for roading conditions. Conversely, when the amount of angularity between the two frames increases, the steering wheel need only be rotated a small amount to obtain a significantly large degree of articulation. This provides an extremely versatile steering system that eliminates the fatigue formerly experienced in the operation of an articulated machine.

BRIEF DESCRIPTION OF THE DRAWINGS

FIG. 4 is a diagrammatic view of the control valve taken along lines 4—4 of FIG. 3;

FIG. 5 is a diagrammatic perspective view similar to FIGS. 2 and 3 with the portions of the frame members articulated to the maximum position;

FIG. 6 is a diagrammatic front view of the control valve taken along lines 6—6 of FIG. 5;

FIG. 7 is a diagrammatic top view of the front and rear frame members showing the positioning of the various components of the steering assembly in the non-articulated position;

FIG. 8 is a diagrammatic top view of the front and rear frame members similar to FIG. 7 showing the positioning the various components of the steering assembly in the maximum articulated position.

FIG. 9 is a diagrammatic section view of a control valve taken along lines 9—9 of FIG. 2; and FIG. 10 is a graph showing the relationship between steering wheel rotation and articulation of the frame members.

BEST MODE FOR CARRYING OUT THE INVENTION

Figure 1:
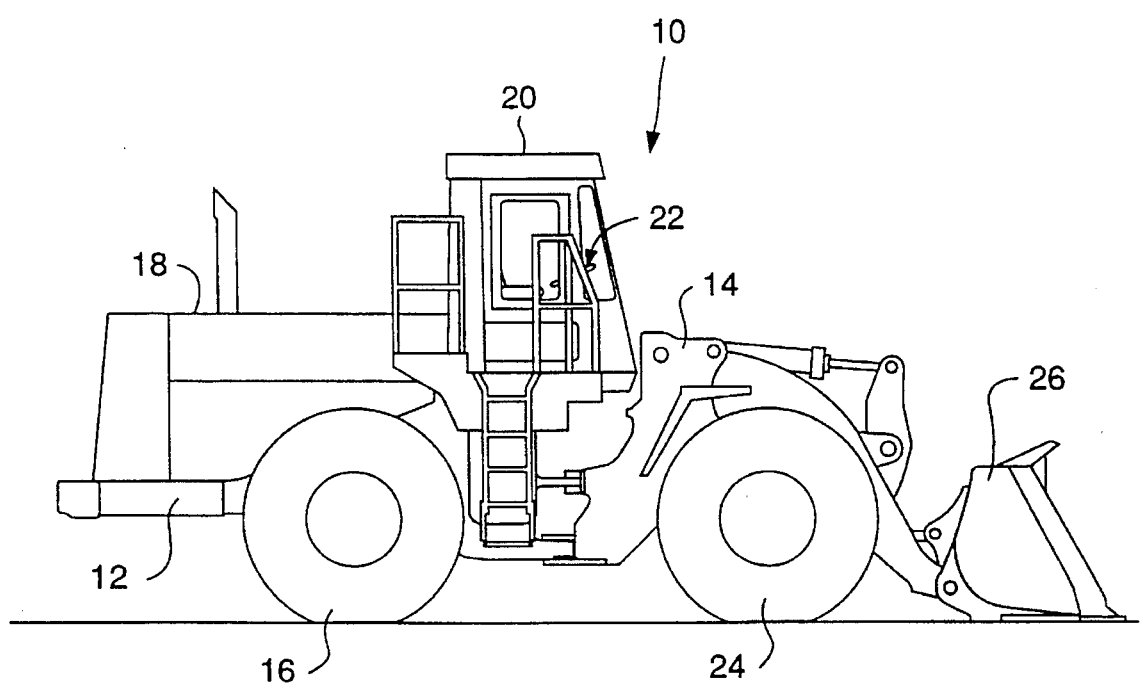
FIG. 1 is a diagrammatic side view of a machine that embodies the principles of the present invention.

Referring to the drawings, a machine 10 is shown to have first and second frame members 12 and 14 respectively, that are mounted to one another for pivoting movement about a substantially vertical axis 15. The first or rear frame member provides support for a pair of wheels 16 (one shown in FIG. 1) that are positioned on opposite sides of the machine and an engine enclosure 18 housing an engine (not shown) that provides drive to the wheels 16. An operator station 20 is mounted to the rear frame 12 and houses a plurality of controls that are utilized to operate the machine. Among the controls is a steering wheel assembly 22 that is normally supported by a console (not shown) that is in turn supported by the operator station.

The second or front frame member 14 also supports a pair of wheels 24 (one shown in FIG. 1) that are positioned on opposite sides of the machine. Normally, although not specifically shown in the drawings, a machine such as the wheel loader shown in FIG. 1, also provides drive from the engine to the front wheels 24. A work implement, such as bucket 26 is mounted on the front frame of the machine and is moveable in a substantially vertical plane to load and deposit material in a well known manner. The controls for operating the work implement are also located within the operator's station.

A pair of fluid actuated steering cylinders 28 (one shown) are mounted between the frame members 12 and 14 on opposite sides of a longitudinal centerline 29 (FIGS. 7 and 8) that runs the length of the machine. The steering cylinders may be actuated to pivot the front frame member with respect to the rear frame member on either side of the longitudinal centerline to provide steering of the machine. A first end portion 30 of the steering cylinder 28 is connected to the rear frame member 12 while a second end portion 32 is connected to the front frame portion as can best be seen in FIG. 2. While not shown in the drawings, the other steering cylinder is mounted on the opposite side of the machine in an identical manner.

A fluid control means, generally indicated at 34, is provided to sequentially control the flow of pressurized fluid to the steering cylinders 28 so that one of the steering cylinders is extended while the other is retracted. The fluid control means includes a control valve 36 that is mounted on the front frame 14 at a location that is substantially centered on the longitudinal centerline 29. The control valve 36 may be communicated directly with an engine driven pump (not shown) or may be a pilot control valve that will in turn control the actuation of a main control valve that is in communication with the engine driven pump. For illustrative purposes, the control valve has been described as being in direct communication with the engine driven pump, it being understood that either system would be acceptable without departing from the principles of the present invention. In either instance, the flow of the pressurized fluid (pilot or system pressure) from the valve is dictated by an actuator 38 (FIG. 9) that is mounted for rotation within the control valve 36. Referring to FIG. 9, it can be seen that the rotary actuator 38 has a shaft 40 that extends into the valve body 42 for rotation about an axis that intersects with a centerline 43 that extends therethrough. A pair of lugs 44 and 46 extend from the shaft 40 on opposite sides of the centerline 43 and are positioned at an angle of approximately 40 degrees to one another. Each lug contacts a plunger 48 and 50 respectively, that is defined by a pair of respective valve spools 52 and 54. The valve spools are mounted within the valve body on opposite sides of the centerline 43. As viewed in FIG. 9, the shaft 40 and the lugs 44 and 46 are positioned in a neutral position wherein no pressurized fluid is being directed to the steering cylinders.

The control valve 36 is actuated by a means generally indicated by reference numeral 56 that includes the steering wheel assembly 22 and a connecting means 58 that extends between steering wheel assembly and the shaft 40 of the rotary actuator 38 of the control valve. As previously set forth, the steering wheel assembly is mounted to the rear frame 12 and includes a steering actuator in the form of a steering wheel 60 that is mounted to a first end portion 62 of a steering column 64. The steering column 64 is mounted for rotation within a console (not shown) that normally extends upwardly from a floor plate 66. A second end portion 68 of the steering column extends through a bore 70 defined in the floor plate 66 to a location beneath the operator station. A bearing (not shown) is positioned within the bore to provide support for the steering column and to permit relative rotation between the steering column and the floor plate. The steering wheel 60 is substantially semi-circular in configuration and defines a straight or flat 74 portion formed across the top portion thereof. As is best shown in FIGS. 7 and 8, the flat 74 is positioned to be angled substantially equal to the angle of articulation of the front frame member before and after a steering correction is made.

The connecting means 58 includes a drive shaft 76 that has a first shaft member 78 and a second shaft member 82 that is mounted for telescopic movement within the first shaft member 78. A first end portion 84 of the drive shaft 76 is connected to the second end portion 68 of the steering column 64 by a first U-joint 86 while a second end portion 88 is connected to the shaft 40 of the rotary actuator 38 by a second U-joint 90.

Figure 2:
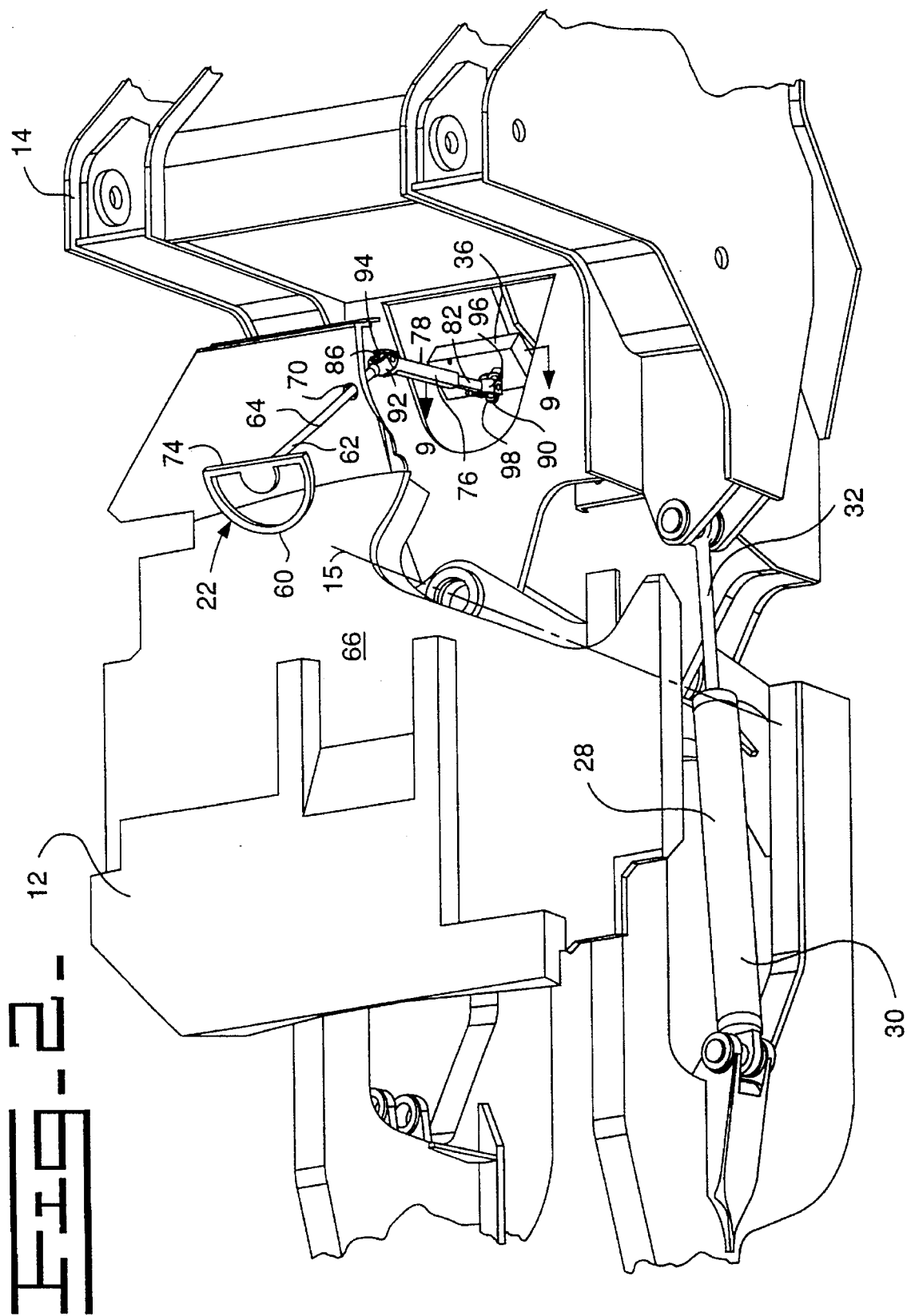
FIG. 2 is a diagrammatic perspective view of the front and rear frame members of the machine shown in FIG. 1 with portions of the frame members broken away to more clearly show the invention.

Referring to FIG. 2, it can be seen that the first U-joint 86 defines a first yoke member 92 formed on the second end portion 68 of the steering column 64 and a second yoke member 94 formed on the first shaft member 78. Likewise, the second U-joint 90 defines a first yoke member 96 formed on the second shaft member 82 and a second yoke member 98 formed on the shaft 40 of the rotary actuator 38. It is important to note that the angular orientation of the first yoke member 92 of the first U-joint 86 is the same as the first yoke member 96 of the second U-joint 90. In the instant embodiment the first yoke members 92 and 96 are shown in FIG. 2 to be positioned with a substantially horizontal orientation when the respective frame members 12 and 14 are generally centered along the longitudinal centerline 29 as is shown in FIGS. 2 and 7. Conversely, the respective second yoke members 94 and 98 are substantially vertically oriented when the respective frame members are in the centered position. Since the first U-joint 86 is connected to the second end portion 68 of the steering column, its position with respect to the vertical pivot axis 15 is fixed. The second U-joint however, is connected to the rotary actuator 38 of the control valve 36 which is mounted to the front frame member 14. Since the first U-joint is positioned on the longitudinal centerline 29, between the control valve and the pivot axis 15, the distance between the first and second U-joints will vary as the front frame articulates about the pivot axis 15. The telescopic movement of the drive shaft 76 accommodates this variation as can be seen in FIG. 8.

Industrial Applicability

The operation of the steering system is illustrated best in the series of movements shown in FIGS. 2–5. In these views, the difference in angular relationship, or articulation, between the frames is illustrated as the frame members 12 and 14 are pivoted with respect to each other during a typical steering sequence.

FIG. 2 illustrates the position of the respective frame members 12 and 14 when the control valve 36 and the steering wheel 60 are in their respective neutral positions before a steering function has been initiated. In this position, the front and rear frame members 12 and 14 are substantially centered along the longitudinal centerline 29. This same positioning is more clearly shown in FIG. 7. Also in this position, the shaft 40 of the rotary actuator 38 is generally positioned along the longitudinal centerline 29. The second yoke member 98 of the second U-joint 90 is positioned in a substantially vertical orientation that defines a reference plane X that passes therethrough. When in the neutral position as shown in FIG. 6, the reference plane X is substantially aligned with a second reference plane Y that extends along a generally vertically extending plane that passes through the center of the rotary actuator 38.

Figure 3:
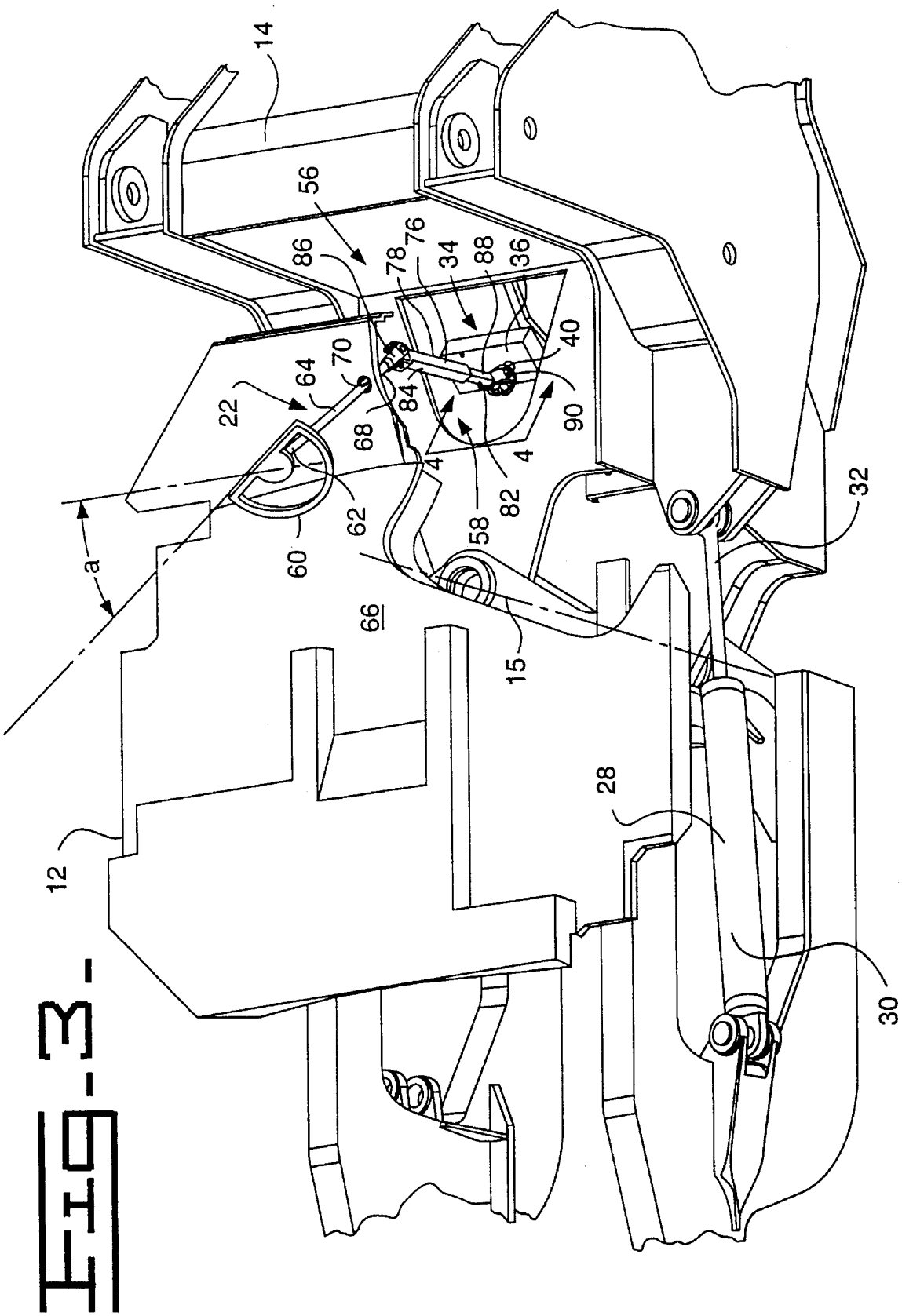
FIG. 3 is a diagrammatic perspective view of the frame members shown in FIG. 2 with portions of the frame members broken away to more clearly show the invention.

Referring now to FIG. 3, it can be seen that the steering wheel 60 has been rotated in a counter-clockwise direction from its neutral position wherein the flat portion 74 is substantially horizontal. For illustrative purposes, this angle is indicated by "a" in FIG. 3. Accordingly, the connecting means 58, through the first and second U-joints 86 and 90, translates the rotation of the steering wheel into counter-clockwise rotation of the rotary actuator 38 with respect to the control valve 36. The amount of rotation of the rotary actuator 38 is indicated by angle "b" which indicates the distance between the reference planes X and Y in FIG. 4. With the rotation of the rotary actuator in a counter-clockwise direction, as shown in FIG. 3, lug 46 will engage the plunger 50 and move it to the left as viewed in the FIG. 9. Valve spool 52 and plunger 48 will be allowed to move to the right under the influence of a biasing force within the spool 52. This coordinated movement of the valve spools will cause pressurized fluid to flow through the body 43 of the control valve, through a plurality of hydraulic hoses or conduits (not shown) to the head end of one of the steering cylinders and the rod end of the opposite steering cylinder. The non-pressurized ends of the respective steering cylinders 28 will be vented to allow the coordinated extension and retraction of the steering cylinders thus pivoting the front frame 14 to the left about the vertical axis 15. As the front frame moves, the control valve 36 will move with the front frame about an arc that is centered on the axis 15. Since the second end portion 68 of the steering column is fixed to the rear frame and does not move with the control valve, the distance between the control valve and the second end portion 68 of the steering column will vary as the front frame pivots. Since the first and second drive shaft members 78 and 82 are telescopically arranged, the drive shaft 76 is permitted to extend and retract to accommodate the variation in distance.

Also, since distance between the control valve 36 and the vertical axis 15 is greater than the distance between the control valve 36 and the second end portion 68 of the steering column, the angular relationship of the U-joints will also change as the front frame 14 pivots. Since the rotary actuator 38 is connected to the second end portion 68 of the steering column 64 by a pair of U-joints 86 and 90, whose angular position is dictated by the steering wheel, relative rotation between the control valve and the shaft 40 of the rotary actuator 38 will naturally occur as the movement of the front frame member continues. The only connection between the steering column and the control valve that isn't fixed is the interface between the rotary actuator and the control valve. Therefore, relative rotation between these components must occur as the front frame member pivots. This relative rotation occurs in a direction that is counter to that of the original direction of rotational input as dictated by rotation of the steering wheel. Therefore as the movement of the front frame member 14 occurs, the shaft 40 of the rotary actuator is caused to move in a clockwise direction as illustrated in the drawings. This in turn, causes the plungers 48 and 50 to move toward their centered or neutral position to close off the flow of pressurized fluid to the steering cylinders 28. As can be seen in FIG. 6, the reference planes X and Y have been brought into alignment even though the frame members are articulated with respect to one another. As can be seen in FIG. 8, the angle of articulation indicated by the angle "c", is just about the same as the angle "a" that indicates the original amount of rotation of the steering wheel. This substantially positions the flat portion 74 of the steering wheel parallel to the components on the front frame that extend transverse to the longitudinal centerline 29 such as the axle extending between the wheels 24. This provides the operator with a mechanical feedback that provides an automotive type "feel" to the steering system since the amount of articulation between the frame members is substantially proportional to the rotation of the steering wheel.

Another very important feature of this invention is the use of a pair of U-joints to connect the drive shaft 76 to the steering column and the rotary actuator as well as the relative positioning of the components of the U-joints 86 and 90. It is a well known principle that the rotation translated through a U-joint, also known as a Cardan's or Hooke joint, does not deliver uniform angular output velocity when operating at an angle. During one revolution of the driving shaft, the driven shaft will operate in alternating phases wherein it is rotating faster or slower than the driving shaft. These phases occur in 90 degree segments of the revolution and since they alternate, ultimately result in one revolution for both the driving and the driven shaft. In other words, the driven shaft will rotate faster, or lead the driving shaft by a certain amount for 90 degrees of rotation and then rotate slower, or lag the driving shaft for the next 90 degrees of rotation by an equal amount. These phases repeat themselves over the next 180 degrees of rotation and at the end of a complete revolution, both shafts will have rotated the same amount. The amount of lag and lead increases as the angle between the shafts increases. This principle is described in greater detail in many text books, one text book in particular is the "Principles of Farm Machinery", Third Edition, authored by R. A. Kepner, Roy Bainer and E. L. Barger, and copyrighted in 1978 by the AVI Publishing Company, Inc.

In the instant invention, the rotation of the steering column 64 is translated to the rotary actuator 38 through a pair of U-joints 86 and 90. The respective yokes of the U-joints are arranged to take advantages of the previously described principle of a Hooke joint. In normal applications, the driving yokes which would correspond to the first yokes 92 and 96 of the respective U-joints 86 and 90 would be positioned normal to each other as would be the driven yoke members 94 and 98. When arranged in this fashion, the steering column would be operating in a lead phase with respect to the drive shaft, and the drive shaft would be operating in a lag phase with respect to the rotary actuator. In arranging the components of the U-joints in this manner the respective phases in which each U-joint operates oppose one another and therefore cancel each other out. The subject invention however, positions the respective driving yokes, first yoke members 92 and 96, in parallel phase with one another. As shown in the drawings, particularly FIG. 2, the first yoke member 92 of the first U-joint 86 is positioned in a substantially horizontal plane as is the first yoke member 96 of the second U-joint. Conversely, the respective second yoke members 94 and 98 of the first and second U-joints 86 and 90 are positioned generally normal to the first yoke members in a substantially vertical plane. In this particular application, the first U-joint 86 is configured so that the steering wheel and therefore the steering column 64, is positioned to primarily operate in a lead phase with respect to the drive shaft 76. Likewise, since the first yoke member 96 of the second U-joint 98 is in a phase parallel to that of the first yoke member 92, the drive shaft 76 is also operating in a lead phase with respect to the actuator shaft 40. Therefore, when the frame members are positioned generally along the longitudinal centerline 29 as shown in FIG. 7, the amount of lead that occurs between the steering wheel and the actuator shaft 40 is actually increased by the cumulative effect of the particular phasing of the first and second U-joints. Since the amount of lead is known to change with the variation in the angular relationship of the U-joints, the amount of lead between the shaft 40 of the rotary actuator 38 and the steering wheel will also vary. This provides a very substantial benefit in the operation of the machine. Since the combined angles of the two U-joints is comparatively high when the front and rear frame members 12 and 14 are more or less aligned along the longitudinal centerline 29, the amount of lead between the steering column and the rotary actuator is also relatively large. Referring to FIG. 10 it can be seen that the initial half of steering wheel rotation, approximately 25 degrees, results in just under 10 degrees of frame articulation. This is very desirable when the machine is being operated over the road at the higher limits of its speed range. The increase in movement of the steering wheel versus the amount of rotation of the rotary actuator provides smoother steering corrections when only slight corrections are required as when operating in a roading mode. This is very similar to an automotive type application.

Conversely, it can be seen in FIG. 10 that the latter 30 degrees of frame articulation, or approximately three quarters of the total amount of frame articulation, occurs during the latter half of steering wheel rotation. This change is created because the angles between the respective U-joint components change as the articulation angle between the front and rear frames changes as was previously described. This is illustrated in FIGS. 7 and 8. It can be seen that as the articulation angle increases, the drive shaft must lengthen to accommodate the change in distance between the first U-joint 86 and the control valve 36. As this occurs, the angle between the first and second yokes 96 and 98 of the second U-joint 90 is reduced. As the angle decreases, so does the amount of lead between the drive shaft 76 and the actuator shaft 40. Simultaneously as this occurs, the second yoke 94 of the first U-joint 86 has moved to the left in a generally horizontal plane with respect to the first yoke member 92. As this change occurs, the lead phase in which the first U-joint has been operating in will gradually reduce as the articulation angle increases and will actually cross over to operation in a lag phase to a minimum extent. The operation of the first U-joint 86 in the lag phase will further reduce the amount of lead in which the second U-joint 90 is operating. The resultant or summation of the operation of both U-joints results in a lead condition between the steering wheel and the actuator shaft 40 that has been greatly reduced. Therefore, in this condition, the actuator shaft will rotate more with respect to the steering wheel rotation. This is extremely desirable when the machine is operating in a truck loading capacity and is maneuvering in very short cycles that requires a high degree of maneuverability. Small amounts of steering wheel rotation will result in larger amounts of rotation of the actuator shaft 40 thus making the control valve more responsive to steering corrections at high degrees of frame articulation. This change in operation between the articulated and non-articulated condition of the machine is referred to as "variable gain", the "gain" terminology referring to the amount of lead between the rotation of the rotary shaft and the steering column.

Therefore it can be seen that with a steering system as set forth above, an articulated machine may be controlled in a manner that will provide the operator with an "automotive" feel without having to turn the steering wheel multiple revolutions. Because the steering wheel needs only to be turned a maximum of approximately 50 degrees to either side, it lends itself extremely well to the positioning of electronic controls on the steering wheel itself. These controls could include speed controls as well as directional and gear selection controls of a transmission. This greatly improves the operation of the machine as far as efficiency and operator fatigue are concerned. In addition, the variable gain provided by the arrangement of the U-joint components provides beneficial steering characteristics in all modes of machine operation.

Other aspects, objects and advantages of this invention can be obtained from a study of the drawings, the disclosure and the appended claims.

We claim:

1. A steering system adapted for use with an articulated machine having first and second frame members mounted to one another for pivoting movement relative to one another in response to the movement of at least one fluid actuator connected therebetween, comprising:

means for controlling the communication of pressurized fluid to the fluid actuator, said controlling means being mounted to one of the first and second frames;

means for actuating the control means, said actuating means being mounted to the other of the first and second frames; and means for connecting the actuating means to the controlling means, said connecting means being attached to the actuating means by a first U-joint and to the controlling means by a second U-joint.

2. The steering system as set forth in claim 1 wherein the first and second frame members are pivotally mounted to one another along a longitudinal centerline of the machine, said pivotal mounting being positioned about a substantially vertically oriented axis.

3. The steering system as set forth in claim 1 wherein the fluid actuator further includes a pair of fluid actuated cylinders mounted between the respective frame members on opposite sides of said centerline, each cylinder having a first end portion mounted to the first frame member and a second end portion mounted to the second frame member, said cylinders being selectively extensible and retractable to pivot one frame with respect to the other.

4. The steering system as set forth in claim 2 wherein the first frame further includes:

a pair of wheels suspended from and positioned on opposite sides of the first frame member;

an engine mounted to the first frame and being operatively connected to at least the first pair of wheels to provide a driving force thereto; and an operator's station mounted to the first frame member for movement therewith, said operator's station having a plurality of control mechanisms mounted therein that are sufficient to operate the machine.

5. The steering system as set forth in claim 3 wherein the second frame member includes:

a pair of wheels suspended from and positioned on opposite sides of the second frame member; and a work implement mounted thereon for movement in a substantially vertical plane.

6. The steering system as set forth in claim 1 wherein the fluid communication control means includes a rotary actuated hydraulic control valve that controls the flow of pressurized fluid to the fluid actuator to selectively pivot the first and second frames relative to one another, said control valve being mounted on the second frame member.

7. The steering system as set forth in claim 6 wherein the actuating means includes a steering wheel assembly having a steering wheel rotatably mounted thereon and wherein movement of the steering wheel results in the rotation of the rotary actuator from a first preselected neutral position within the control valve wherein no fluid is directed to the fluid actuator, to a second preselected position within the control valve wherein pressurized fluid is directed to the fluid actuator to move the second frame with respect to the first frame, and whereupon said movement of the second frame with respect to the first frame will cause the rotation of the rotary actuator back toward its first preselected position to gradually reduce and finally eliminate fluid flow to the fluid actuated cylinders in absence of any additional movement of the steering wheel.

8. The steering system as set forth in claim 7 wherein the connecting means includes a telescoping drive shaft having a first end portion connected to the steering wheel assembly by the first U-joint and a second end portion connected to the control valve by the second U-joint.

9. The steering system as set forth in claim 8 wherein the steering wheel defines a generally straight portion, said straight portion and said second frame member being positioned at approximately the same angle with respect to the longitudinal centerline of the machine when the rotary actuator is in its first position within the control valve.

10. The steering system as set forth in claim 9 wherein the first and second U-joints each define a pair of yoke members, said yoke members being positioned in a preselected angular orientation with respect to one another whereupon the amount of rotation translated to the rotary actuator from the steering wheel is increases as the angle of articulation increases.

11. A steering system adapted for use with an articulated machine having first and second frame members pivotally connected to one another for relative movement therebetween, comprising:

at least one hydraulic cylinder connected between the first and second frame members, said cylinder being actuatable to move the respective frame members with respect to one another to provide steering for the machine;

a steering assembly rotatably mounted on the first frame member;

a control valve mounted on the second frame member, said control valve having a rotary actuator that is rotatable with respect to the control valve to selectively control the movement of the hydraulic cylinder; and a connecting means having a first end portion connected to the steering assembly and a second end portion connected to the rotary actuator of the control valve, said connecting means being operable in a first mode to translate the rotary movement of the steering assembly into a rotary input of the rotary actuator and a second mode wherein movement of the control valve, with the second frame member relative to the first frame member, is translated into a rotation of the rotary actuator in a direction counter to that of the rotary input imparted by the steering assembly.

12. The steering system as set forth in claim 11 wherein a pair of hydraulic cylinders are connected between the first and second frame members on opposite sides of a longitudinal centerline of the machine.

13. The steering system as set forth in claim 12 wherein the steering assembly includes:

a steering column having first and second end portions and being rotatably mounted on the first frame member; and a steering wheel mounted on the first end of the steering column.

14. The steering system as set forth in claim 13 wherein the connecting means further includes:

a drive shaft having a first shaft member;

a second shaft member telescopically mounted within the first shaft member for relative movement with respect thereto;

a first U-joint connected between the second end portion of the steering column and the first shaft member; and a second U-joint connected between the second shaft member and the rotary actuator of the control valve.

15. The steering system as set forth in claim 14 wherein the first and second frame members are pivotally mounted to one another about a substantially vertical axis and the control valve is mounted on the second frame member a preselected distance from said vertical axis to move about said axis along a preselected radius during relative movement between the first and second frame members.

16. The steering system as set forth in claim 15 wherein the second end portion of the steering column is positioned between the first frame member and the second frame member and the distance between the rotary actuator of the control valve and the second end portion of the steering column varies in length as the first and second frames move relative to one another thereby creating a change in the angle of orientation between the control valve and the connecting means.

17. The steering system as set forth in claim 14 wherein the first U-joint defines a first yoke member that is positioned at a preselected orientation with respect to the steering column and the first shaft member and the second U-joint defines another first yoke member that is positioned at a preselected orientation with respect to the second shaft and the rotary actuator, said orientation of the respective first yoke members being such that they are positioned in the same angular phase with one another so that the angular velocity of the rotary actuator with respect to that of the steering wheel is increased as the angle of articulation between the second frame and the longitudinal centerline of the machine increases.

18. A steering system for an articulated machine, comprising:

a first frame member;

a second frame member pivotally mounted to the first frame member for relative movement with respect thereto;

at least one fluid actuator connected between the first and second frame members, said fluid actuator being moveable to cause the relative movement between the frame members to provide steering for the machine;

a steering wheel assembly rotatably mounted on the first frame member;

a control valve mounted on the second frame member, said control valve defining an actuator that is rotatable with respect to the control valve to control the movement of the fluid actuator; and a connecting means having a first end portion connected to the steering wheel assembly by a first U-joint and a second end portion connected to the rotary actuator by a second U-joint, said connecting means being operational to translate rotation of the steering wheel assembly into rotation of the rotary actuator in a manner wherein the amount of rotation of the rotary actuator increases with respect to that of the steering actuator as the articulation angle of the respective frame members increases.

19. The steering system as set forth in claim 18 wherein the first and second frame members are pivoted about a generally vertical axis and the control valve rotates about said axis upon relative movement between the respective frame members.

20. The steering system as set forth in claim 19 wherein the first U-joint is positioned along the longitudinal centerline of the machine and is spaced from the axis of rotation a first preselected distance that is fixed with respect thereto.

21. The steering system as set forth in claim 20 wherein the control valve is spaced from the axis of rotation a distance that is greater than the preselected distance between the first U-joint and the axis of rotation, said distance between the control valve and the first U-joint being variable with respect thereto upon relative movement of the respective frame members.

22. The steering system as set forth in claim 21 wherein the connecting means includes a first drive shaft member that is connected to the first U-joint and a second drive shaft member that is connected to the second U-joint, said second drive shaft member being telescopically mounted within the first drive shaft member to allow the length thereof to vary with respect to the distance between the control valve and the first U-joint in response to relative movement between the respective frame members.

23. The steering system as set forth in claim 22 wherein the steering wheel assembly includes a steering column having a first end portion that defines a steering wheel and a second end portion that is connected to the first U-joint whereupon rotation of the steering wheel assembly in a first direction is translated by the connecting means into rotation of the rotary actuator of the control valve in a first direction away from a neutral setting to cause the relative movement of the second frame member with respect to the first frame member, and whereupon the resultant movement of the second frame member will cause the rotary actuator to move in a direction counter to said first direction until the rotary actuator is moved back to said neutral position.

24. The steering system as set forth in claim 23 wherein the first U-joint defines a first yoke connected to the steering wheel assembly and a second yoke defined by the first drive shaft member, and the second U-joint defines a first yoke connected to the second drive shaft member and a second yoke connected to the rotary actuator, said first yoke of the first U-joint being positioned in parallel relationship to the first yoke of the second U-joint to position the respective U-joints in parallel phase with respect to one another, said parallel phasing allowing approximately one quarter of the total of machine articulation to occur during the initial one half of the total rotation of the steering wheel assembly and approximately three quarters of the total machine articulation to occur during the later half of rotation of the steering wheel assembly.

\* \* \* \* \*